Patented Aug. 3, 1948

2,446,475

UNITED STATES PATENT OFFICE 2,446,475

REARRANGEMENT PROCESS

George W. Hearne, Berkeley, and Donald S. La France, Richmond, Calif., assignors to Shell Development Company, San Francisco, Calif., a corporation of Delaware No Drawing. Application August 31, 1942, Serial No. 456,832

12 Claims. (Cl. 260—654)

The present invention relates to the rearrangement of structural form of organic compounds, and more particularly to the allylic rearrangement of organic compounds having or comprising a straight olefinic chain of at least three carbon atoms, said chain having two or more chlorine atoms attached thereto. In one of its specific embodiments, the invention covers the allylic rearrangement of hydrocarbons comprising or having a straight olefinic chain of four or more carbon atoms, said chain having at least two chlorine atoms attached thereto.

It is known that some organic compounds comprising or containing an aliphatic unsaturated chain of at least three carbon atoms, and having at least two chlorine atoms attached to such unsaturated straight chain, are valuable primary materials or intermediates for the manufacture of important technical products. It is also known that some of these organic chlorinated products are more valuable for certain purposes than others. As a typical example, 1,2-dichlorbutene-3 may be readily and substantially quantitatively partially dehydrochlorinated to 2-chlorbutadiene-1,3, which, in turn, may be polymerized to an excellent synthetic rubber having properties which are, in some respects, even better than those of ordinary rubber, as, for instance, the substantial insolubility of this artificial or synthetic rubber in petroleum or its derivatives. On the other hand, 1,4-dichlorbutene-2 (which, in fact, is an isomer of 1,2-dichlorbutene-3), although it is valuable for some industrial purposes owing to the readiness with which its chlorine atoms can be exchanged, is totally unsuitable as a starting material for the direct manufacture of chloroprene (2-chlorbutadiene-1,3) since this dichloride does not yield chloroprene when subjected to dehydrochlorination either by non-catalytic pyrolysis or by heat treatment in the presence of an alkali.

When organic compounds containing or comprising aliphatic unsaturated chains of at least three carbon atoms and at least two olefinic or double bonds in said chain are subject to chlorination, via addition, it is difficult, and frequently totally impossible, to direct this reaction to produce a given or desired polychloride. In most cases, the reaction products consist of a mixture of various isomeric unsaturated polychlorides. As stated, most of these have an industrial use. However, in some instances, and particularly since some of these unsaturated dichlorides or polychlorides are of greater industrial interest than others, it would be highly desirable and profitable to be able to convert all of the unsaturated polychlorides into a specific, desired unsaturated polychloride. As an example of the mixture produced during the chlorination, by addition, of organic compounds of the above-defined and hereinbelow described class, reference may be made to the chlorination, via addition, of butadiene. As will be pointed out more fully hereinbelow, the yield of dichlorbutenes will depend largely on the process employed for this addition of chlorine to the butadiene. However, irrespective of the method employed, the reaction products obtained will contain both 1,2-dichlorbutene-3 and 1,4-dichlorbutene-2, both of these dichlorides being formed side by side. The 1,2-dichlorbutene-3 is produced in greater quantity than its 1,4-unsaturated isomer. This is pointed out by Muskat in "Journal of the American Chemical Society," volume 52, page 4046, wherein it is stated that when butadiene-1,3 was subjected to partial chlorination (i. e. with chlorine in a quantity insufficient to completely saturate the butadiene) about twice as much of the 1,2-dichlorbutene-3 as 1,4-dichloride was formed. In some of the tests effected in the vapor phase, the ratio of the 1,2-dichloride to the 1,4-dichloride was found to be as high as 4 to 1. Since the 1,2-dichlorbutene-3 can be substantially quantitatively dehydrochlorinated to chloroprene, it is seen that a major portion of the dichlorbutenes formed during the chlorination, via addition, of butadiene may be converted to this product. However, in view of the valuable properties of the synthetic rubber produced by the polymerization of chloroprene, it is desirable to be able to utilize all of the unsaturated dichlorides produced by the chlor-addition of butadiene.

In other cases, it may be advantageous to have the dichlorbutane in the form in which its chlorine atoms could be readily exchanged. In other words, it may be desirable to chlorinate the butadiene and to obtain as much of the 1,4-dichlorbutene-2 isomer as is possible. Similarly, when organic compounds containing or comprising aliphatic unsaturated chains of the above-defined class are subjected to partial chlorination, and particularly to chlorination at a temperature above the dew point of the reaction products but below that at which substantial chlor-substitution occurs, it is frequently objectionable to obtain a mixture of various isomeric, partially chlorinated unsaturated compounds, instead of a product substantially consisting of a single specific partially chlorinated unsaturated compound which may then be used for the manufacture of a given product.

Unlike the corresponding dibromobutenes, the dichlorobutenes obtained by the chlorination of butadiene, or by other known processes, do not transpose easily into one another. This has been ascertained by Muskat et al., loc. cit. page 4047. The same is true of other organic compounds comprising or containing an aliphatic unsaturated chain of at least three carbon atoms and having at least two chlorine atoms attached to such unsaturated chain. As in the case of dichlorobutenes, these organic compounds cannot be easily transposed or transformed into their isomers. For example, Romburgh, "Bulletin de la Societe Chimique," 36, 557 (1881) states that rearrangement of 1,1-dichlorpropene-2 to 1,3-dichlorpropene was obtained only after heating for ten hours at 100° C. in the presence of a saturated aqueous hydrochloric acid solution.

It is therefore one of the main objects of the present invention to provide a process for such conversion of the organic compounds described above into their isomers. A further object of the invention is to provide a process whereby isomeric mixtures of organic compounds comprising or containing an aliphatic unsaturated chain of at least three carbon atoms and having at least two chlorine atoms attached to such chain, may be readily subjected to allylic rearrangement to produce a desired isomer thereof. A still further object of the invention is to provide a process whereby polychlorinated unsaturated organic compounds having or comprising an unsaturated aliphatic chain having four or more carbon atoms and at least two chlorine atoms attached thereto may be made to undergo allylic rearrangement readily and substantially quantitatively.

Another object of the invention is to provide a process for the substantially quantitatively allylic rearrangement of 1,4-dichlorobutene-2 to 1,2-dichlorobutene-3, or vice versa. Another object is to substantially quantitatively utilize butadiene or its homologues, by subjecting its dichlorinated mono-olefinic derivatives (obtained by the chlorination via addition) to allylic rearrangement to produce a desirable isomer of such derivatives. A still further object is to provide a process for obtaining large yields of chloroprene (2-chlor-butadiene-1,3) from butadiene. Still other objects will be apparent from the following description.

The terms "allylic rearrangement," allylically converting," and the like, as employed herein and in the appended claims, refer to a reaction in which an allyl type polychlorinated unsaturated organic compound, that is a compound having an aliphatic unsaturated chain of at least three carbon atoms and at least two chlorine atoms attached to said chain in such a manner that a chlorine atom is attached to a saturated carbon atom which is attached directly to an unsaturated carbon atom, undergoes a rearrangement in which the last-mentioned chlorine atom migrates to the unsaturated carbon atom furthest removed from the carbon atom originally carrying this chlorine atom, while the unsaturated linkage migrates to occupy the position between the thus originally chlorinated carbon atom and the adjoining originally unsaturated carbon atom.

It has now been discovered that the above and other objects may be attained by subjecting the polychlorinated unsaturated organic compounds of the above-defined and hereinbelow described class to a heat treatment in the presence of copper. Substantially any copper-containing substance may be employed in the heat treatment. In addition to copper metal, alloys of copper and compounds of copper with other elements are applicable. These catalysts may be employed severally or in combination, a particularly efficacious combination consisting of a copper halide, preferably a chloride, bromide, or an iodide and metallic copper.

Compounds of copper, besides the copper halides, which may be used in the execution of the heat treatment, include, for example, the corresponding carbonates, oxides and sulfides, cuprous sulfite, cuprous thiocyanate, cupric sulfate, cupric nitrate, cupric acetate, cupric phosphate, cupric selenate, cupric tartrate, cupric stearate, cupric lactate, Paris green, etc. These compounds may or may not react during the course of the heat treatment with any HCl, which may be present to form cupric and/or cuprous chloride.

Examples of suitable copper alloys which may be employed in lieu of or in conjunction with copper metal and/or copper compounds include the various brasses and bronzes, i. e. alloys of copper with zinc, tin, lead, iron, which alloys may also contain iron and phosphorus, copper-nickel alloys, copper-nickel-zinc alloys, copper-manganese alloys, copper-silicon alloys, alloys of copper and aluminum, alloys of copper and the noble metals, etc. The copper metal or copper alloy may be used in substantially any form as gauze, wire, fillings, tubing, turnings, granules, flakes, shavings, and the like.

Although the invention is particularly adapted for the rearrangement of dichlorbutenes into their isomers, the present process of allylic rearrangement is generally applicable to the treatment of various organic compounds containing or comprising aliphatic unsaturated chains of at least three carbon atoms having at least two chlorine atoms attached to such chain. These compounds include the various isomers of the dichlorinated propenes, dichlorinated or polychlorinated butenes, pentenes, hexenes, and the like, their homologues and analogues. As examples of these compounds, reference may be made to 1,1-dichlorpropene-2, 2,2-dichlorbutene-3, 1,1-dichlorbutene-2, 1,2-dichlorbutene-2, 1,2-dichlorbutene-3, 1,4-dichlorbutene-2, 2,3-dichlorbutene-1, and their higher homologues. Also, the compounds falling within the above class include unsaturated polychlorinated compounds having more than one double bond in the chlorinated aliphatic chain, as, for instance, 1,4-dichlorpentadiene-2,4, 1,1,4-trichlorpentadiene-2,4, and the like. The double bonds in such polyolefinic compounds may be conjugated or may be separated by at least two single linkages. The above polychlorinated mono- and poly-olefins may be of secondary or tertiary character, and may be linked to one or more cycloalkyl and/or aromatic radicals. For example, compounds such as 1,1-dichlor-2-methyl-propene-2, 1-phenyl-2,3-dichlorbutene-3, may be allylically rearranged in accordance with the process of the present invention.

When an unsaturated organic compound of the above-described class is subjected to treatment according to the invention, the duration of the reaction and the amount of the catalyst will depend on a number of variables, and may be readily determined or chosen according to the activity of the catalyst, type of compound subjected to the treatment, etc., so that substantially no undesirable side reactions, such as products of condensation or polymerization, are obtained. Usually, very small quantities of the catalyst (ranging from a trace to a few percent) will suffice to initiate and/or accelerate the reaction. As to the reaction temperature, this will vary with the stock treated, the reaction product desired, etc. If the unsaturated polychloride to be allylically rearranged has a higher boiling point than the desired isomer, the rearrangement may be carried out by distilling the unsaturated polychloride in the presence of the copper catalyst, the temperature at the still-head being the boiling point of the removed lower boiling isomer. If a low boiling polychloride is to be treated, it may be heated under reflux during which the temperature rises to an intermediate between the boiling points of the two isomers, the maximum being the temperature at which the equilibrium mixture of the two polychlorides boils under reflux.

The present invention finds a particular application in the process of converting butadiene-1,3 to chloroprene. This may be accomplished by first chlorinating the butadiene via addition to produce a reaction product containing both the desirable 1,2-dichlorbutene-3 and its isomer, 1,4-dichlorbutene-2. The dichlorbutenes may then be subjected to allylic rearrangement to yield substantially only the 1,2-dichloride, which may then be dehydrochlorinated to produce substantially quantitative, or at least very high, yields of chloroprene. In view of the importance of this process, each of the steps thereof will be so described in greater detail.

The addition of a halogen, such as chlorine or bromine, to polyolefins, and particularly to dienes having conjugated double bonds (such as butadiene-1,3 and its homologues), has been known for some time. Usually, such halogen addition has been attempted or effected in the liquid phase, and especially in the presence of inert solvents or diluents of the type of carbon disulfide, chloroform, etc. U. S. Patent No. 2,038,593, for instance, discloses and claims the partial halogen addition reaction at a temperature of an ice-salt bath, by conveying butadiene and a halogen (chlorine) in a slow stream under the surface of carbon disulfide which partially fills a reaction tube or vessel. Such partial halogenation in the liquid phase or in the presence of a liquid film (if the reaction were effected at a higher temperature but below the dew point of the reactants and/or reaction products) is, however, accompanied by the formation of saturated and/or highly halogenated products, the presence of which in the reaction products is frequently undesirable since it decreases the yield of the partially halogenated unsaturated compounds which may be used as intermediates in the production of desirable and valuable products. Thus, as has been noted, when butadiene-1,3 is chlorinated, the partially chlorinated butadiene, and particularly 1,2-dichlorbutene-3, may be easily and substantially quantitatively converted by dehydrochlorination to yield chloroprene, whereas the saturated 1,2,3,4-tetrachlorbutane cannot be efficiently transformed into this desirable intermediary used for the production of artificial rubber.

It has been recently discovered that the formation of these undesirable saturated polyhalides may be greatly inhibited, while promoting the formation of the unsaturated polyhalides, by effecting the halogenation in a truly vapor phase and in the presence of the halogen in an amount or concentration insufficient to completely saturate the primary material. This is described and claimed in a copending application, Serial No. 302,026, filed October 30, 1939, now Patent No. 2,299,477. According to this process the poly-olefins, such as butadiene or its homologues, are subjected to the action of the halogen, e. g. chlorine, in a quantity insufficient to effect a complete saturation of the olefins, the reaction being realized at such a temperature that there is no liquid film or phase in the reaction vessel at any time throughout the continuance of the operation. In order to realize this, either or both of the reactants is/are preheated, and the temperature in the reaction zone is maintained above the boiling point of the reaction products (which naturally have boiling points or dew points above those of the reactants). In order to obtain high yields of products of halogen addition the reaction temperature must be below that at which substantial halogenation, via substitution, occurs.

Although when the partial halogenation of compounds of the type of butadiene is effected in a truly vapor phase according to the teachings of the above-outlined copending application, the reaction products contain only small quantities of saturated highly halogenated products, the reaction product still consists or predominates in the various isomers of the unsaturated partially halogenated compounds. The partial addition of chlorine to butadiene even in the total and continuous absence of a liquid phase or film, still produces a mixture predominating in 1,2-dichlorbutene-3 and 1,4-dichlorbutene-2, these two dichloride isomers being formed side by side. If the final desired product is chloroprene, it is necessary to convert the 1,4-dichloride into 1,2-dichlorbutene-3. This may be effected according to the present invention, as above stated, by subjecting the mixture to a distillation in the presence of the above-described catalysts, for example, in the presence of relatively small quantities of copper and of cuprous chloride. The overhead fraction, comprising substantially all of the two isomers, consists of 1,2-dichlorbutene-3. Instead of treating the whole mixture of the dichloride isomers, it is possible to first distill over only the 1,2-dichloride present in the mixture, and then to subject the 1,4-dichlorbutene-2 to the allylic rearrangement according to the present invention.

The 1,2-dichlorbutene-3 may now be effectively and substantially quantitatively dehydrochlorinated to chloroprene by the removal of a hydrogen chloride molecule from each of the 1,2-dichloride molecules. In this connection it must be noted that, although high temperature pyrolysis of other dichlorbutenes such as 2,3-dichlorbutene-1, does produce chloroprene, the pyrolysis of either 1,2-dichlorbutene-3 or 1,4-dichlorbutene-2 forms 1-chlorbutadiene-1,3 instead of 2-chlorbutadiene-1,3 (chloroprene). In order to produce chloroprene, it has been proposed to treat 1,2-dichlorbutene-3 with solid caustic alkali. This is described in Carothers Patent No. 2,038,538. In accordance with one of the embodiments of the present invention it has been found that yields greatly exceeding those obtainable by the previously proposed method may be attained by employing an aqueous or alcoholic solution of an alkali, such as sodium hydroxide, potassium hydroxide, calcium hydroxide, sodium carbonate, etc. According to this process, the dichloride to be dehydrochlorinated is introduced into a solution of the alkali, such as a 10% aqueous sodium hydroxide solution, preferably with stirring or agitation. The solution is maintained above the boiling point of chloroprene (i. e. about 60° C.) and preferably at the boiling point of the alkali solution. The reaction produces chloroprene which vaporizes due to the elevated temperature employed. In order to avoid undesirable side reactions, the chloroprene should be removed substantially as rapidly as formed. The dehydrochlorination can also be effected with alcoholic potassium hydroxide at or about room temperature, or with aqueous sodium carbonate or calcium hydroxide at about their boiling points. The reactions are, however, somewhat slower than when effected with aqueous sodium hydroxide. Also, possibly due to the longer contact period at the relatively high temperatures, some of the chloroprene was found to be polymerized during the treatment with alcoholic solutions or with aqueous solutions of alkalies other than sodium hydroxide.

It was pointed out that in some cases the unsaturated polychloride to be allylically rearranged according to the present invention has a boiling point below that of the desired isomer. In such a case it is naturally impossible to effect a quantitative rearrangement by merely distilling the primary material in the presence of the copper catalyst. Therefore, in order to convert a given unsaturated polychloride of the class described herein into its higher boiling isomer, recourse is had to heating with total refluxing of the overhead fraction. By subjecting the relatively low boiling unsaturate to such heating with total refluxing, the polychlorinated unsaturate is gradually converted into its relatively higher boiling isomer. However, it is not possible to obtain a quantitative conversion in a single operation since the quantity of the compound which has been allylically rearranged will depend on the equilibrium constant. For example, the allylic rearrangement of 1,2-dichlorbutene-3 according to the present invention yields only 65% of 1,4-dichlorbutene-2. Obviously, by fractionally removing the higher boiling 1,4-dichloride, and by subjecting the unreacted 1,2-dichloride to another treatment according to the present process, it is possible to obtain further yields of the desired isomer, so that, by repeating these operations, substantially quantitative yields may be attained.

Because an equilibrium mixture of 1,2-dichloride and 1,4-dichloride cannot be effectively fractionated in the presence of the catalyst without some rearrangement of the 1,4-dichloride into its 1,2-isomer, it is frequently advantageous to remove the catalyst prior to such fractional distillation. In the alternative, the rearrangement of the 1,4-dichloride back to the 1,2-dichloride may also be avoided by fractionation at reduced pressures and therefore at lower temperatures, or by using a continuous stripping column in which the rearrangement is minimized due to the relatively short contact period at the elevated temperatures. Also, a relatively lower boiling unsaturated polychloride may be continuously rearranged to its higher boiling isomer in the following manner: the primary material is refluxed in the presence of a catalyst until approximately an equilibrium is attained; the vapors are withdrawn continuously from the kettle to a distillation column from which the higher boiling isomer is withdrawn as the bottom fraction, while the relatively lower boiling polychloride is removed as the overhead fraction and is returned to the kettle wherein it is again subjected to rearrangement with refluxing. Obviously, to make the process continuous, fresh quantities of the relatively lower boiling unsaturated polychloride may be continuously or otherwise introduced to the kettle wherein the allylic rearrangement is being effected.

The conversion of 1,4-dichlorbutene-2 into the corresponding 1,2-dichlorbutene-3, and vice versa, as well as the application of the process to the allylic rearrangement of other unsaturated polychlorides of the described class, are illustrated in the following examples which are intended to be construed only as illustrative of the preferred embodiments of the invention.

*Example I*

A mixture consisting of 1,4-dichlorbutene-2 and of 1,2-dichlorbutene-3 was distilled in the presence of a small amount of copper wire and cuprous chloride. The 1,4-dichlorbutene-2, which boils at 155° C.–160° C., was found to have been rapidly and substantially quantitatively converted to the 1,2-dichloride which boils at 122° C., and which was removed substantially immediately from the reaction zone.

*Example II*

1,2-dichlorbutene-3 was refluxed with a trace of cuprous chloride and some copper wire for four hours. The product was then cooled, washed with water, dried, and fractionated under reduced pressure (to avoid decomposition). It was found that the reaction product comprised a mixture of 35% 1,2-dichlorbutene-3 and 65% of 1,4-dichlorbutene-2.

*Example III*

2,3-dichlorbutene-1 ($CH_2:CCl.CHCl.CH_3$), having a boiling point of 111.8° C., a specific gravity of $D_4^{20}=1.1411$ and a refractive index of $n_D^{20}=1.4571$, was refluxed for several hours with copper and a small amount of cuprous chloride. It was noticed that the kettle temperature rose. At the end of the run, an analysis of the reaction product showed that it comprised a mixture of about 25% of unchanged dichloride (i. e. 2,3-dichlorbutene-1) and 75% of an isomer obtained by allylic rearrangement. This isomer was 1,2-dichlorbutene-2 ($CH_2Cl.CCl:CH.CH_3$) boiling at about 130.2° C.–130.8° C., having a specific gravity of $D_4^{20}=1.1692$ and a refractive index of $n_D^{20}=1.4734$.

The following example is presented to illustrate a preferred method for the production of high yields of chloroprene from butadiene in accordance with the process described herein:

*Example IV*

Butadiene-1,3 and chlorine were separately preheated to a temperature of about 150° C., and were then intimately commingled in a molal ratio of about 4 to 1. The mixture was then conveyed through a reaction chamber filled with carbon chips and maintained at a temperature of between about 150° C. and 190° C., the rate of passage of the gaseous mixture being such that 1.26 gm. of chlorine were introduced into the chamber per minute. The reaction products showed that the yield of 1,2-dichlorbutene-3 and 1,4-dichlorbutene-2 was about 70 mol per cent based on the chlorine applied, the exact composition of the product being:

| Reaction Product | Yield in mol per cent of chlorine applied |
| --- | --- |
| Monochlor-diolefin | 2.4 |
| 1,2-dichlorbutene-3 | 54.8 |
| 1,4-dichlorbutene-2 | 15.2 |
| 1,2,3,4-tetrachlorbutane | 4.8 |
| Polymer | 2.1 |

The mixture was fractionally distilled to recover the two dichlorides. The 1,4-dichloride (boiling at about 155° C.–160° C.) was then rapidly and substantially quantitatively converted to its 1,2-isomer, which boils at 122° C., by distilling the 1,4-dichlorobutene-2 in the presence of a small amount of copper wire and cuprous chloride. The 1,2-dichloride obtained directly by the chlorination of the butadiene and that obtained by the catalytic allylic rearrangement were then slowly added to a boiling 10% sodium hydroxide solution. The mixture was maintained in a state of agitation, and the chloroprene formed as the result of this reaction was distilled off substantially as rapidly as it was formed. It was found that about 94% of the dichloride was converted to chloroprene, or approximately a yield of 65.8% based on the butadiene treated.

Although only a 65.8% yield was recovered, this yield is far greater than that heretofore obtainable by operating according to the known processes. Also, the above yield could be further increased by employing efficient recovery systems. This is due to the fact that it was noticed that relatively large handling losses were produced in the above-described process, particularly in the recovery of the unsaturated dihalides produced during the vapor phase halogenation of the diene. This loss, if recovered by properly designed means, would further increase the actual yield of the final product.

Although the examples were specific to the allylic rearrangement of dichlorbutenes and to the production of chloroprene from butadiene, the invention includes the allylic rearrangement of other unsaturated organic compounds of the described class.

The process may be executed at any suitable pressure. For example, atmospheric, moderately elevated or reduced pressures may be used during the allylic rearrangement step, as well as during the other steps included in the process of converting butadiene or the like to chloroprene, or its respective homologue. Obviously, the optimum temperatures will vary with the pressure employed.

It has been shown that the rearrangement of polychlorides into their isomers may be effectively and substantially quantitatively attained by a distillation in the presence of copper. While this wet or substantially non-pyrogenetic method of effecting the rearrangement is possessed of many advantages, it is to be understood that vapor phase operation is not excluded from the scope of the invention. Any of the copper catalysts applicable to the low temperature method may be used in vapor phase operation. In general, when operating in vapor phase, it is preferred to contact the vapors of the polychloride under treatment and the copper catalyst at a temperature within the range of from about 400° C. to about 500° C., but substantially higher or lower temperatures may be used. A convenient way of carrying out the rearrangement in vapor phase is to pass the vapors of the polychloride through a copper, copper alloy, or copper lined tube. Good results may also be obtained with a quartz or other tube constructed of material other than copper, appropriately packed, for example, with copper gauze and/or a copper compound, such as a copper halide. In operating with a packed tube, the catalyst may be supported upon a suitable carrier such as pumice, charcoal, silica gel, alumina, and the like.

The rate at which the vapors of the treated chloride are conveyed through the tube depends inter alia on the length and diameter thereof, the reaction temperature, the quantity and manner of packing, etc. A feed rate of from four to five grams per minute was found satisfactory in the rearrangement of 1,2-dichlorobutene-3, using a quartz tube 56 cm. long and 1.9 cm. in diameter.

This application is a continuation-in-part of our copending application, Serial Number 303,098, filed November 6, 1939, now abandoned.

We claim as our invention:

1. A process of converting 1,4-dichlorobutene-2 into 1,2-dichlorobutene-3 comprising subjecting the 1,4-dichlorobutene-2 to the presence of a copper metal and a copper compound, maintaining the liquid at its boiling point and removing the 1,2-dichlorobutene-3 thus produced.

2. A process for producing high yields of chloroprene which comprises commingling butadiene with chlorine in the vapor phase in the complete and continuous absence of a liquid film and in quantities insufficient to effect the complete chlorination of the butadiene, effecting chlorine addition at a temperature above that at which condensation of the product occurs but below that at which substantial halo-substitution into butadiene is effected thereby producing a reaction mixture predominating in 1,2-dichlorbutene-3, and 1,4-dichlorbutene-2, subjecting the 1,4-dichlorbutene-2 under non-polymerizing conditions and in the presence of cuprous chloride to a temperature between about the boiling temperature of 1,2-dichlorbutene-3 and the temperature at which the 1,4-dichlorbutene-2 boils thereby converting the 1,4-dichlorbutene-2 into 1,2-dichlorbutene-3, commingling the 1,2-dichlorbutene-3 with aqueous alkali solution and subjecting said mixture to elevated temperatures to convert the 1,2-dichlorbutene-3 into chloroprene, and separately removing said chloroprene substantially immediately after its formation.

3. The process according to claim 2, wherein the 1,2-dichlorbutene-3, after commingling with the alkali solution, is subjected to a temperature substantially in the neighborhood of the boiling point of chloroprene.

4. A process for producing chloroprene which comprises chlorinating butadiene to form a mixture of 1,2-dichlorbutene-3 and 1,4-dichlorbutene-2, separating 1,4-dichlorbutene-2 from the mixture, subjecting the 1,4-dichlorbutene-2 to a heat treatment at about the boiling temperature in the presence of copper metal whereby it is rearranged to 1,2-dichlorbutene-3, fractionally distilling off the 1,2-dichlorbutene-3 from the reaction mixture substantially as fast as it is formed, introducing the 1,2-dichlorbutene-3, at about the rate at which it is consumed by the reaction, into an aqueous sodium hydroxide solution which is agitated and maintained at about its boiling temperature, and distilling chloroprene from the reaction mixture substantially as soon as it is formed therein.

5. A process for producing chloroprene which comprises chlorinating butadiene to form a mixture of 1,2-dichlorbutene-3, and 1,4-dichlorbutene-2, subjecting the 1,4-dichlorbutene-2 in the presence of copper metal and a copper compound to a temperature between about the boiling temperature of 1,2-dichlorbutene-3 and the temperature at which the 1,4-dichlorbutene-2 boils thereby converting the 1,4-dichlorbutene-2 into 1,2-dichlorbutene-3, commingling the 1,2-dichlorbutene-3 with an aqueous solution of an alkali of the group consisting of the alkali metal hydroxides, the alkali metal carbonates and the alkaline earth metal hydroxides and subjecting said mixture to elevated temperature to convert the 1,2-dichlorbutene-3 into chloroprene, and separately removing said chloroprene substantially immediately after its formation.

6. A process for producing chloroprene which comprises chlorinating butadiene to form a mixture of 1,2-dichlorbutene-3, and 1,4-dichlorbutene-2, subjecting the 1,4-dichlorbutene-2 in the presence of copper metal and a copper halide to a temperature between about the boiling temperature of 1,2-dichlorbutene-3 and the temperature at which the 1,4-dichlorbutene-2 boils thereby converting the 1,4-dichlorbutene-2 into 1,2-dichlorbutene-3, commingling the 1,2-dichlorbutene-3 with a liquid solution of an alkali at elevated temperature to convert the 1,2-dichlorbutene-3 into chloroprene, and separately removing said chloroprene substantially immediately after its formation.

7. A process of converting 1,4-dichlorbutene-2 into 1,2-dichlorbutene-3 comprising subjecting the 1,4-dichlorbutene-2 to the presence of cuprous chloride, maintaining the liquid at its boiling point and removing the 1,2-dichlorbutene-3 thus produced.

8. A process for effecting the rearrangement of a dichlorobutene of the group consisting of 1,4-dichlorobutene-2 and 1,2-dichlorobutene-3 to the other member of the group which comprises heat treating the dichlorobutene at about the boiling temperature in the presence of copper metal, and separating the produced isomeric dichlorobutene from the resulting mixture.

9. A process for effecting the rearrangement of a dichlorobutene of the group consisting of 1,4-dichlorobutene-2 and 1,2-dichlorobutene-3 to the other member of the group which comprises heat treating the dichlorobutene at about the boiling temperature in the presence of copper metal and a copper compound, and separating the produced isomeric dichlorobutene from the resulting mixture.

10. A process for effecting the rearrangement of a dichlorobutene selected from the group consisting of 1,4-dichlorbutene-2 and 1,2-dichlorbutene-3 to the other member of the group, which comprises subjecting the dichlorbutene to the presence of cuprous chloride, maintaining the liquid at its boiling point, and removing the isomeric dichlorbutene thus produced.

11. A process of converting 1,2-dichlorobutene-3 into 1,4-dichlorobutene-2 comprising subjecting the 1,2-dichlorobutene-3 to the presence of copper metal and a copper compound, maintaining the liquid at its boiling point and removing the 1,4-dichlorobutene-2 thus produced.

12. A process of converting 1,2-dichlorbutene-3 into 1,4-dichlorbutene-2 comprising subjecting the 1,2-dichlorbutene-3 to the presence of cuprous chloride, maintaining the liquid at its boiling point and removing the 1,4-dichlorbutene-2 thus produced.

GEORGE W. HEARNE.
DONALD S. LA FRANCE.

REFERENCES CITED

The following references are of record in the file of this patent:

UNITED STATES PATENTS

| Number | Name | Date |
| --- | --- | --- |
| 2,038,593 | Muskat | Apr. 28, 1936 |
| 2,104,789 | Carothers | Jan. 11, 1938 |
| 2,242,084 | Nicodemus | May 13, 1941 |

FOREIGN PATENTS

| Number | Country | Date |
| --- | --- | --- |
| 505,573 | Great Britain | May 12, 1939 |

OTHER REFERENCES

Muskat, "Jour. Am. Ch. Soc.," vol. 52, pages 4054–5 (1930).